United States Patent [19]

Takagi et al.

[11] Patent Number: 5,041,698
[45] Date of Patent: Aug. 20, 1991

[54] COVER PLATE ASSEMBLY FOR WALL-MOUNTED ELECTRICAL WIRING DEVICES

[75] Inventors: Mitsuhiro Takagi; Hideo Kuwabara, both of Tsu; Hideo Hayashi, Kadoma; Masaaki Nakamura, Tsu, all of Japan

[73] Assignee: Matsushita Electric Works, Ltd., Japan

[21] Appl. No.: 398,975

[22] Filed: Aug. 28, 1989

[30] Foreign Application Priority Data

Sep. 8, 1988 [JP] Japan ................. 63-224991

[51] Int. Cl.⁵ ............................. H02G 3/14
[52] U.S. Cl. ........................................ 174/66
[58] Field of Search ..................... 174/66; 220/241

[56] References Cited
U.S. PATENT DOCUMENTS 2,984,725  5/1961  Hubbell et al. ............. 174/66 X
4,733,330  3/1988  Tanaka et al. .............. 174/66 X
4,835,343  5/1989  Graef ............................ 174/66

Primary Examiner—Leo P. Picard
Assistant Examiner—David A. Tone
Attorney, Agent, or Firm—Stevens, Davis, Miller & Mosher

[57] ABSTRACT

A cover plate assembly for wall-mounted electrical wiring devices includes a plate frame disposed on a wall surface as surrounding a wall opening in the wall surface. The wall opening is provided to receive therein one or more electrical wiring devices such as switches. The plate frame has a window through which a portion of the wiring device extends outwardly. A face plate is placed over the plate frame to entirely conceal the same. The face plate is made from a plastic material and has a center opening through which a portion of the electrical wiring device is exposed to be accessible from outside of said face plate. Also included in the assembly is an under plate which is to be fixed with respect to the wall surface for holding said plate frame therebetween. The under plate is made from a flat metal stamping and secured to the rear of the face plate for reinforcement of the same.

5 Claims, 9 Drawing Sheets

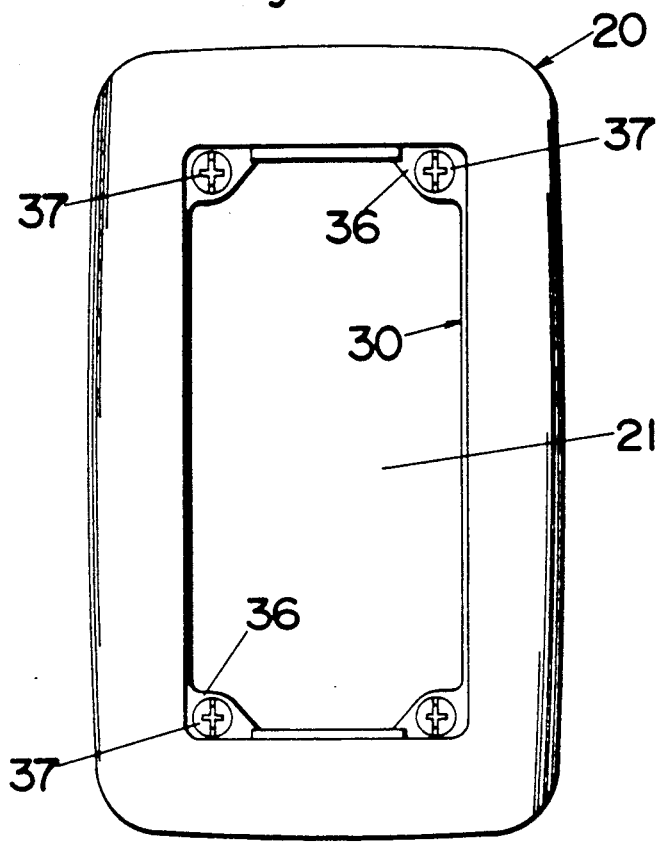
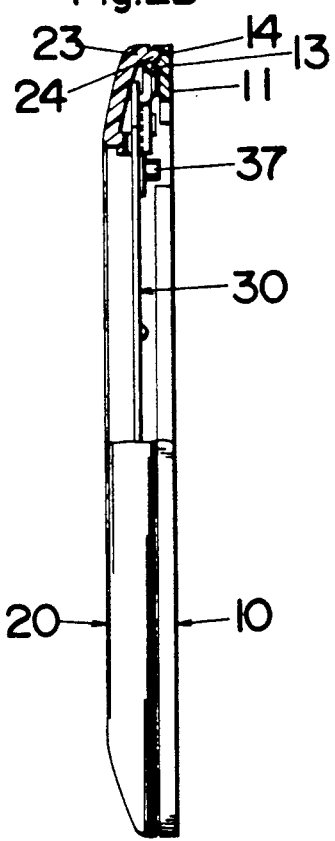

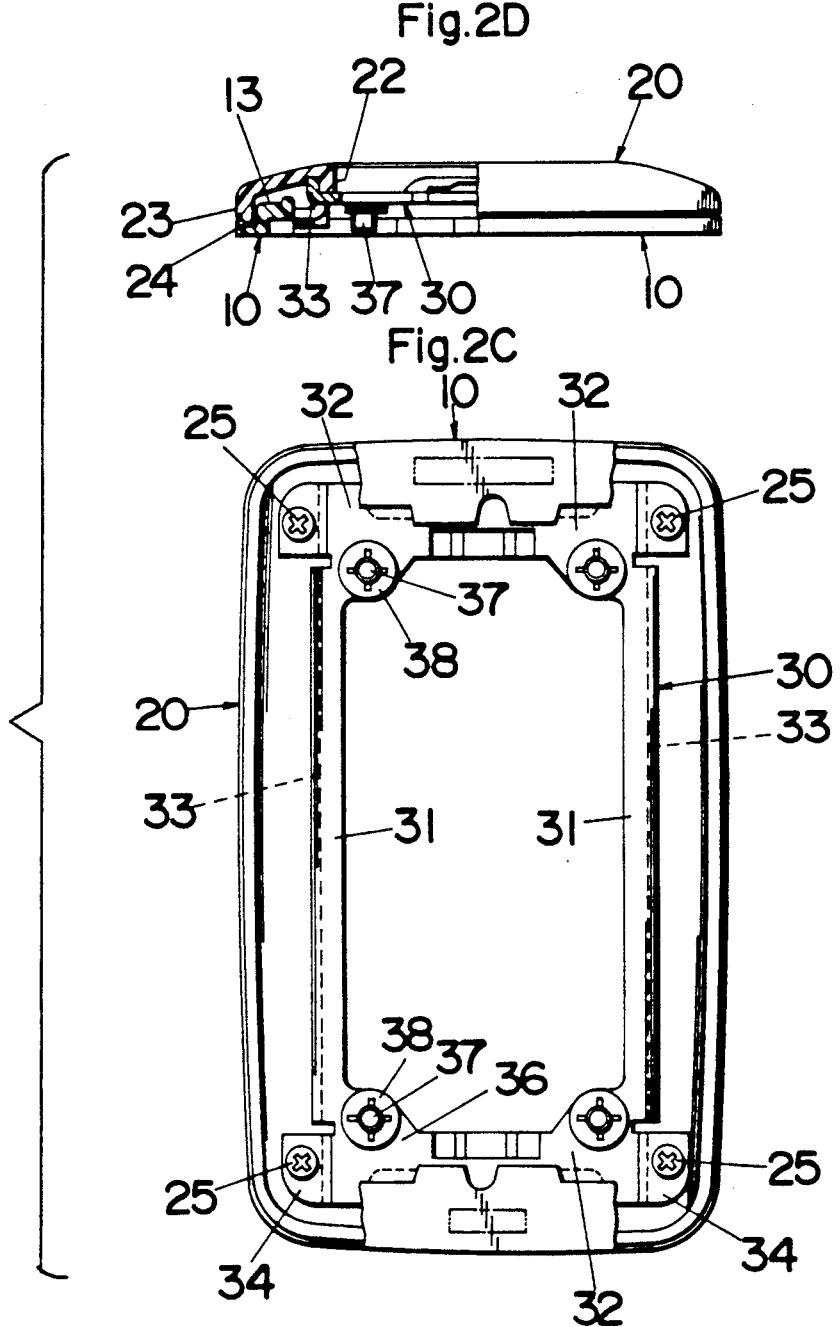

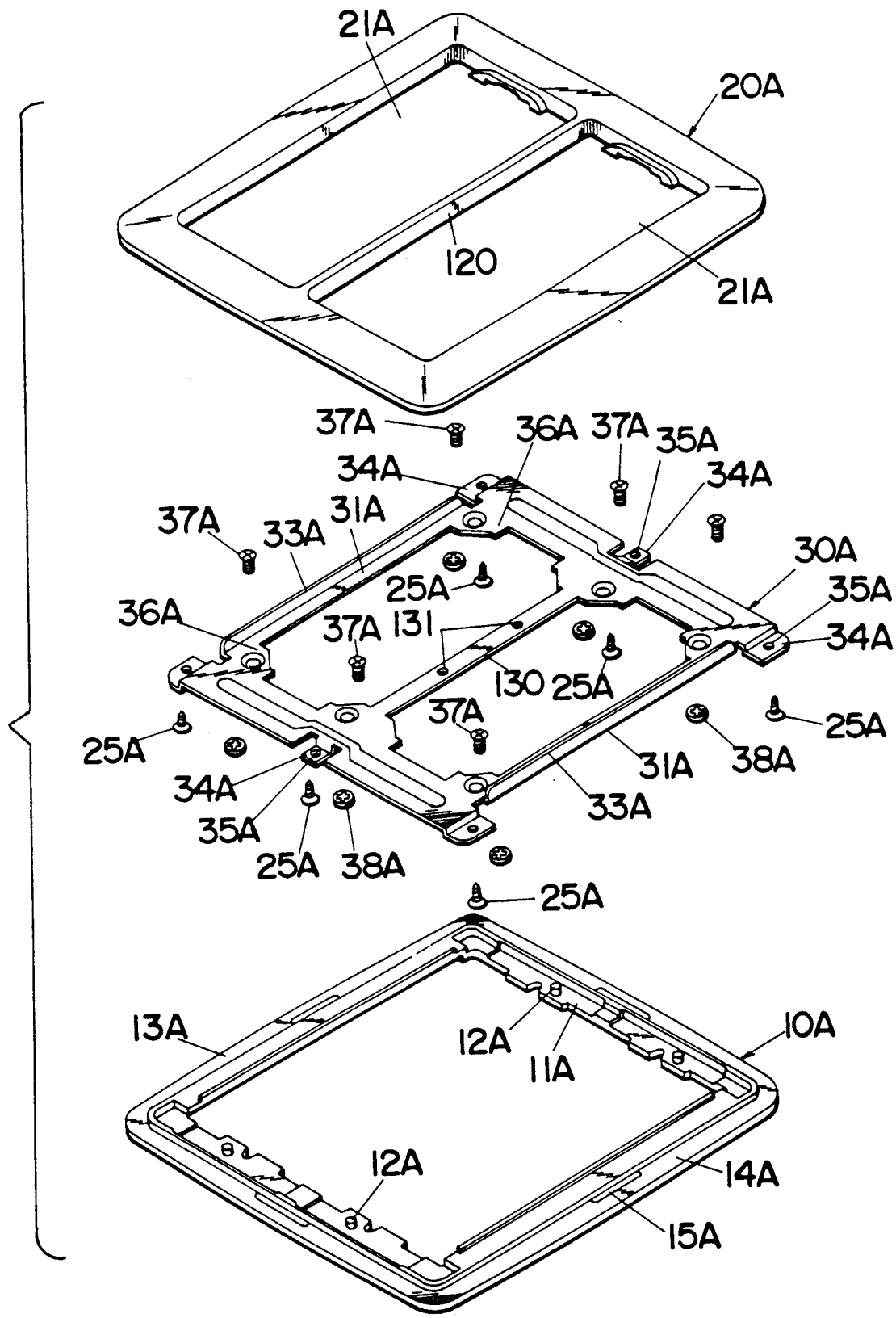

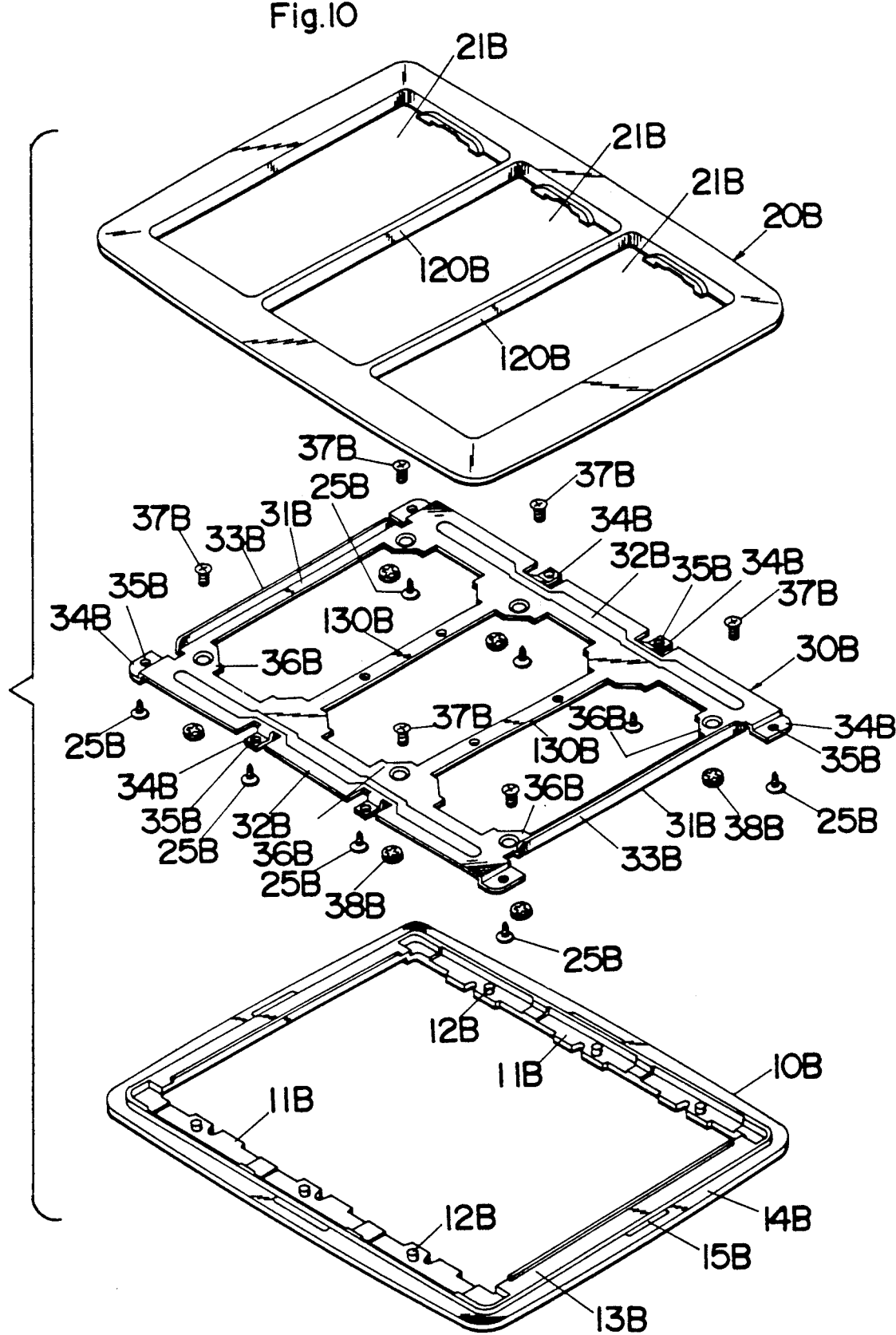

COVER PLATE ASSEMBLY FOR WALL-MOUNTED ELECTRICAL WIRING DEVICES

BACKGROUND OF THE INVENTION

1. Field of the Invention

The present invention is directed to a cover plate assembly for wall-mounted electrical wiring devices, and more particularly to such assembly including a plate frame surrounding a wall opening and a face plate placed over the plate frame.

2. Description of the Prior Art

In the prior cover plate assembly, it is usual to use a plate frame for surrounding a wall opening in which one or more electrical wiring devices such as switches are installed and a face plate placed over the plate frame to conceal therebehind the plate frame as well as a mount bracket of the wiring devices while exposing through a center opening of the face plate only an operating portion such as an operator handle of the wiring device. The face plate is normally made from a plastic material as it is easy to have a decorative finish and is economical to manufacture. In such a prior art assembly, a problem arises when the center opening of the face plate is occupied fully by an operator handle of the wiring device. The problem is that the operator handle may be jammed due to dimensional instability of the center opening resulting from warp or deflection which is very likely in the face plate of plastic material. To overcome the problem, it has been a general practice to strengthen the face plate by the use of a backing or under plate which is made from a die cast material. However, such die cast under plate requires an extra trimming work to remove unacceptable burrs and therefore adds an extra manufacturing cost to the cover plate assembly.

SUMMARY OF THE INVENTION

The above problem has been eliminated in the present invention which discloses an improved cover plate assembly for wall-mounted electrical wiring devices. In accordance with the present invention, the cover plate assembly comprises a plate frame, a face plate, and an under plate. The plate frame is disposed on a wall surface to surround a wall opening in the wall which receives one or more electrical wiring devices. The plate frame has a window through which a portion of said wiring device extends outwardly. The face plate is made of a plastic material and placed over the plate frame to entirely conceal the same with a portion of the wiring device exposed through a center opening of the face plate to be accessible from outside of the face plate. The under plate, which is to be fixed with respect to the wall surface for holding the plate frame therebetween, is made from a flat metal stamping and secured to the rear of the face plate. By the incorporation of the metal under plate, the face plate of plastic material can be well reinforced and prevented from warping or deflecting, whereby the face plate can have enhanced dimension stability, particularly to the dimension of the center opening so that the operator handle of substantially the same dimension as the center opening can be successfully received in the center opening without causing any undesirable jamming. Further, because of the metal stamping, the under plate is manufactured at a low cost and therefore makes it possible to provide the whole cover plate assembly at a low manufacturing cost.

Accordingly it is a primary object of the present invention to provide an improved cover plate assembly of which a face plate can be well reinforced to have dimensional stability by the addition of an under plate of low manufacturing cost.

In a preferred embodiment, the under plate is received within the thickness of the face plate so that it adds no additional thickness to the whole assembly, which is therefore another object of the present invention.

The under plate may be fixed to the face plate by means of screws. Alternatively, the under plate may be fixed to the face plate by the use of heat-bonding technique in which integral studs on the rear of the face plate extend through corresponding holes in the under plate and heat-deformed to effect permanent connection of the under plate to the face plate.

In a preferred embodiment, the under plate is formed in its inner periphery with tabs which are adapted to be fastened to a mount bracket mounting the electrical wiring devices. The tabs are positioned within the periphery of the center opening to be accessible from the front. The electrical wiring device has one or more operator handles which are received in the center opening to conceal the tabs therebehind. Thus, the face plate and under plate combination can be easily secured to the mount bracket by screws extending through the tabs into the mount bracket, while the tabs and the associated screws can be concealed behind the operator handles of the wiring device. This is particularly effective when the operator handle can be attached to the wiring devices after installing the cover plate assembly.

These and still other advantageous objects and features will become apparent from the following description of the preferred embodiments when taken in conjunction with the attached drawings.

BRIEF DESCRIPTION OF THE DRAWINGS

FIGS. 2A to 2D are respectively a front view, a side view partly in section, a partly broken rear view, and an end view partly in section, of the cover plate assembly;

FIGS. 9 and 10 are exploded perspective views, respectively illustrating other modifications of the above embodiment.

DETAILED DESCRIPTION OF THE EMBODIMENT

Figure 1:
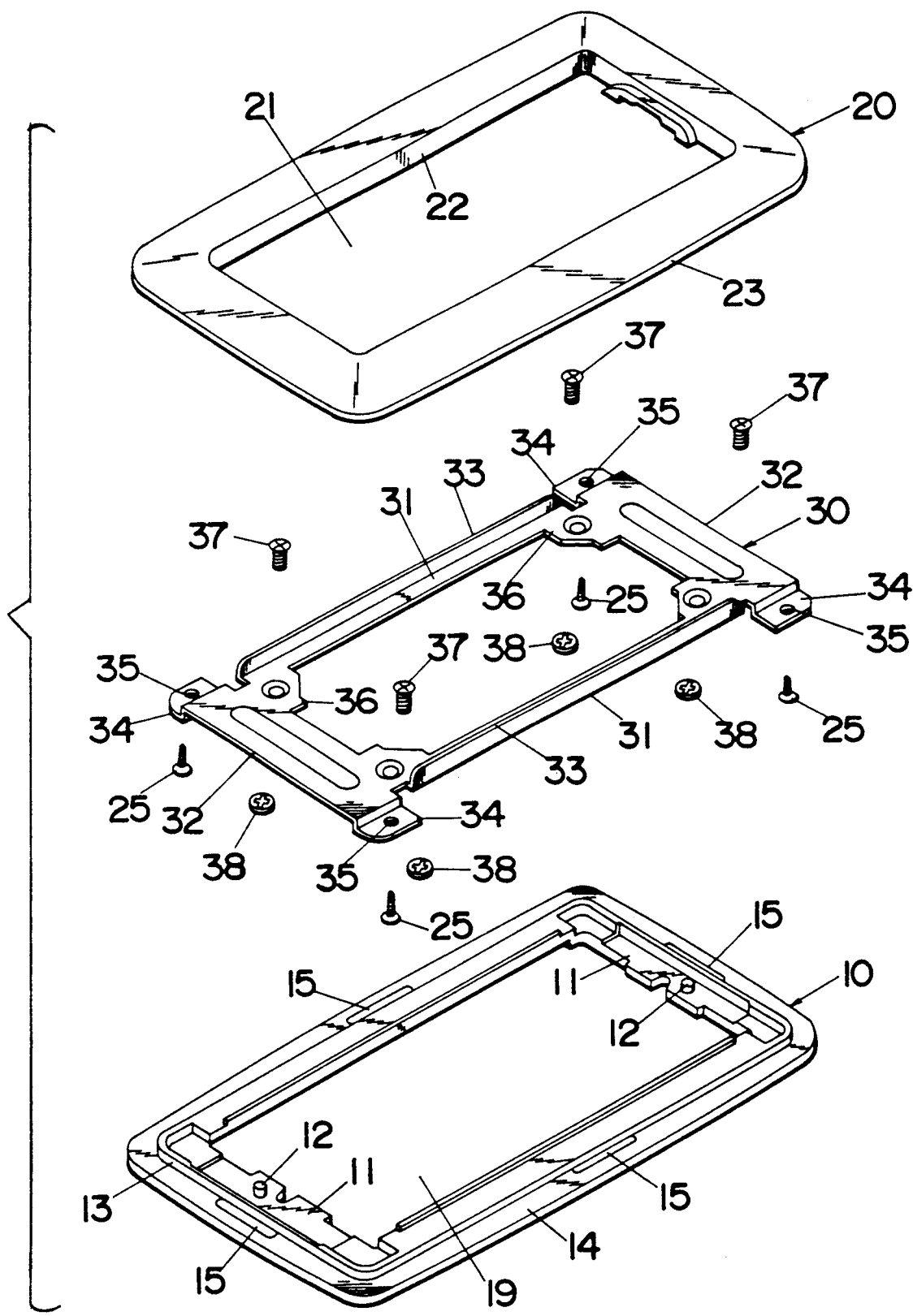
FIG. 1 is an exploded perspective view of a cover plate assembly in accordance with a preferred embodiment of the present invention.
Figure 3:
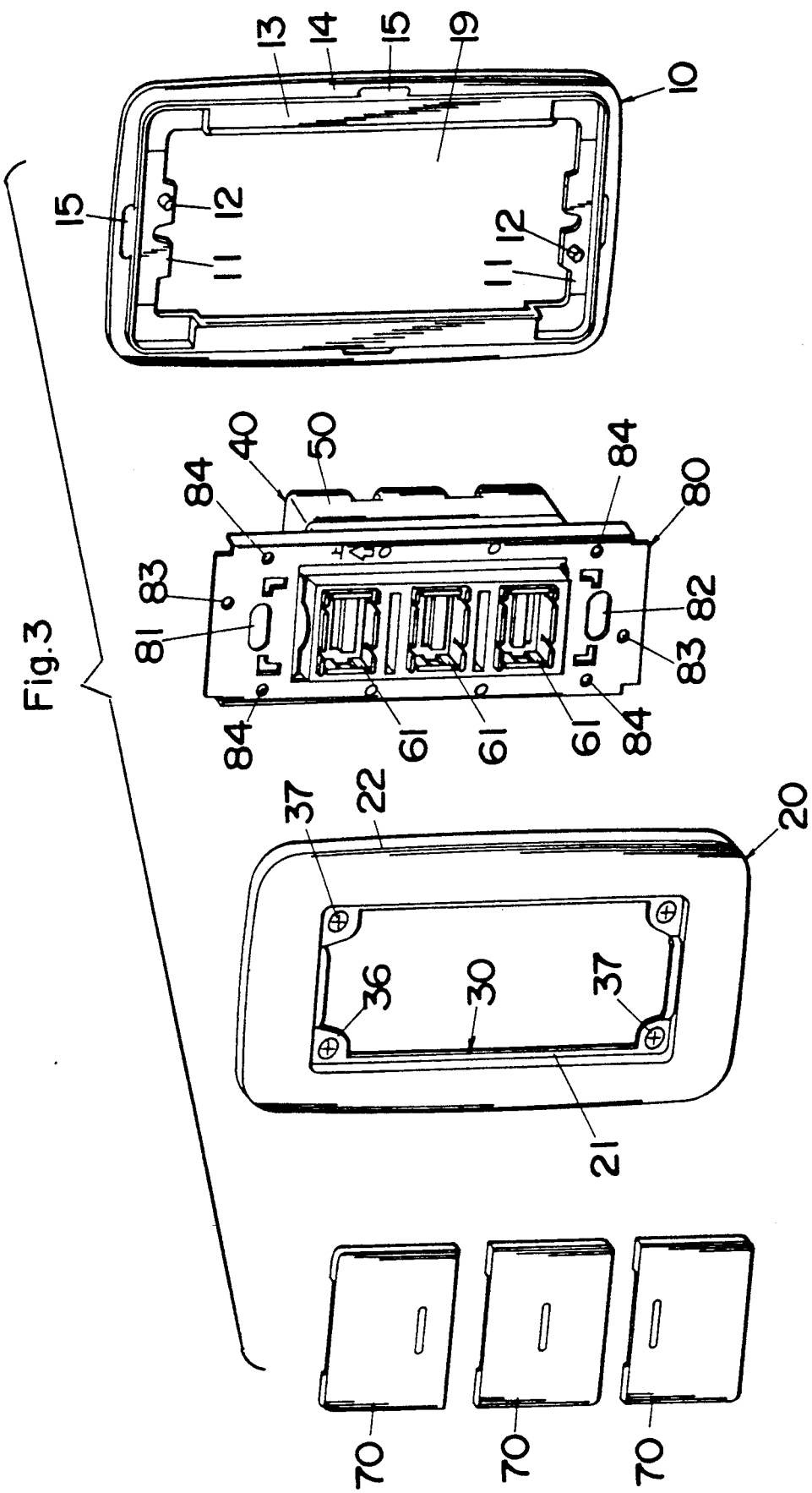
FIG. 3 is an exploded perspective view of the above assembly shown together with a switch assembly as one typical electric wiring device.

Referring now to FIG. 1, there is shown a cover plate assembly for wall-mounted electrical wiring devices in accordance with a preferred embodiment of the present invention. The assembly comprises a plate frame 10, a face plate 20, and an under plate 30 backing the face plate 20. The plate frame 10 and the face plate 20 are both made from a like plastic material, while the under plate 30 is made from a flat metal stamping. In the present embodiment, the cover plate assembly is illustrated in combination with a switch assembly 40 as one typical wall-mounted electric wiring device, as shown in FIGS. 3 to 7.

Figure 4:
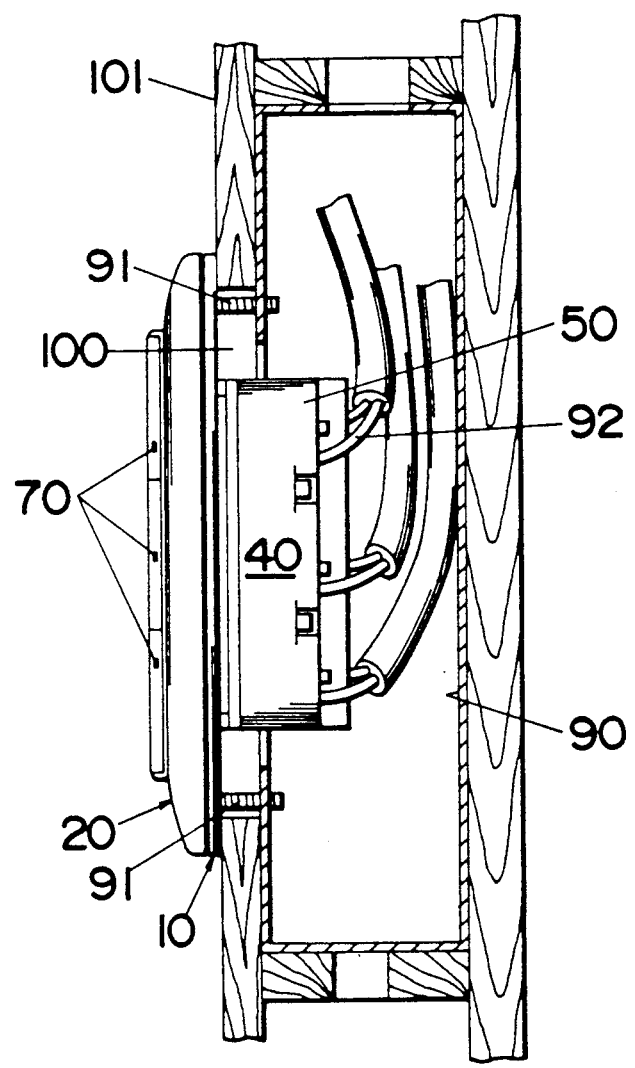
FIG. 4 is a sectional view illustrating a wall installation of the cover plate assembly and the switch assembly.
Figure 5:
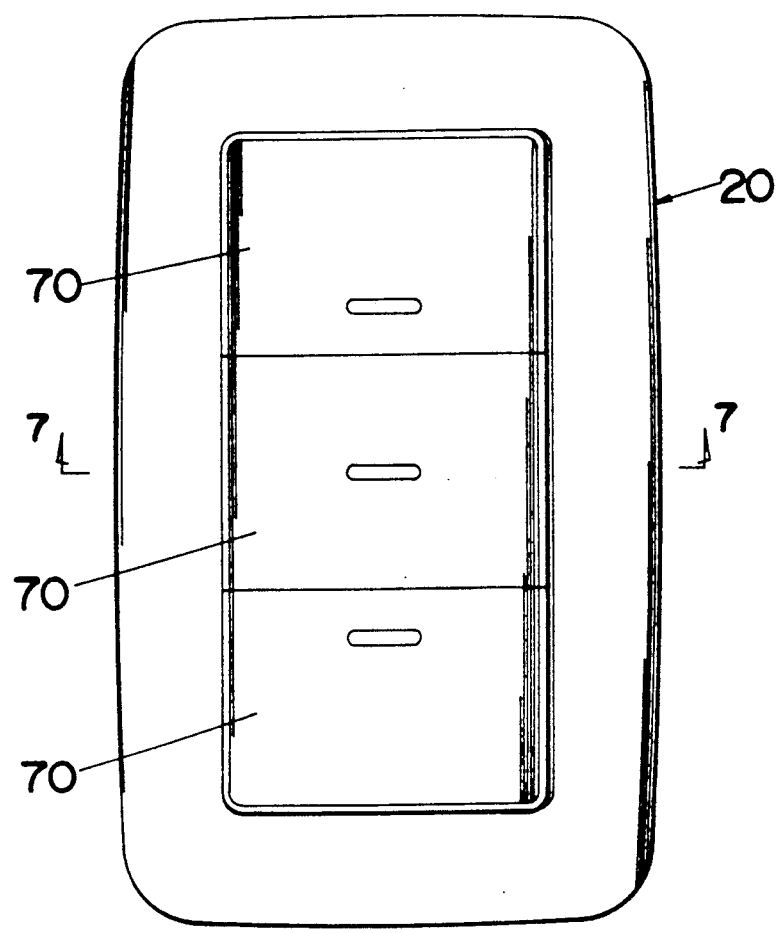
FIG. 5 is a front view of the combined cover plate assembly and the switch assembly.
Figure 6:
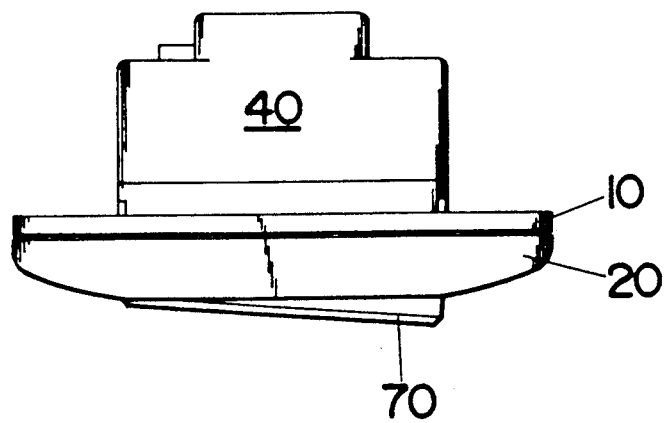
FIG. 6 is a top view of the combined cover plate assembly and the switch assembly.
Figure 7:
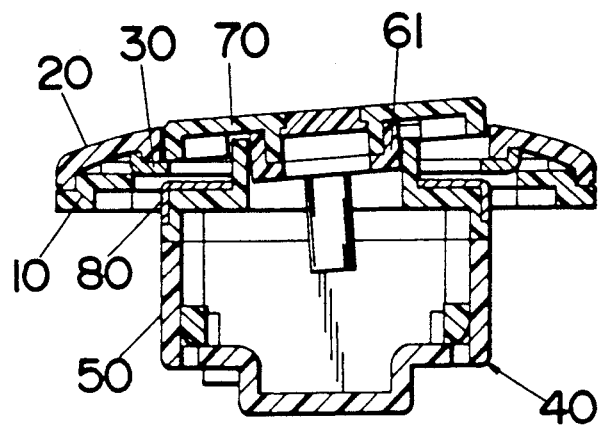
FIG. 7 is a sectional view taken along line 7—7 of FIG. 5 with an internal mechanism of the switch assembly removed.

The switch assembly 40 comprises a housing 50 accommodating three independent switch mechanisms each including contacts and an actuator 61 thereof three separate operator handles 70 detachable to corresponding actuators 61, and a mount bracket 80 carrying the housing 50. The actuator 61 is movably supported in the housing 50 for rocking movement between two positions for effecting contact closure and opening. Each handle 70 is of a wide flat configuration and is detachably coupled to each actuator 61 to be rockable therewith for contact closure and opening. The housing 50 is provided with terminal holes (not shown) into which suitable wires 92 are inserted for electrical connection with corresponding contacts. As shown in FIG. 4, the mount bracket 80 (although not seen in FIG. 4) carrying the housing 50 is secured to a wiring box 90 embedded in a wall opening 100 to position the switch assembly 40 partly within the wall opening 100 while exposing a front portion thereof outwardly of the wall opening 100. Screws 91 are used to extend through elongated holes 81 and 82 in the upper and lower portions of the mount bracket 80 for securing the mount bracket 80 to the wiring box 90.

The plate frame 10 is placed against a wall surface 101 to surround the wall opening 100 and is held between the mount bracket 80 and the wall surface 101. The plate frame 10 is in the form of a rectangular frame which defines inside thereof a window 19 and which is formed with recessed inner flanges 11 at upper and lower ends. The mount bracket 80 is positioned with the upper and lower ends thereof seated on the inner flanges 11 and with positioning posts 12 on the inner flange 11 fit into corresponding holes 83 in the mount bracket 80. A loop wall 13 is formed on the front surface of the plate frame 10 to define outwardly thereof an outer flange 14 for abutment with the outer periphery of the face plate 20. It is noted that the mount bracket 80 is received within the thickness of the plate frame 10.

The face plate 20, which is in the form of thin flat rectangular plate with a rectangular center opening 21, is placed over the plate frame 10 to conceal the same therebehind, while exposing the actuators 61 of the switch assembly 40 in the center opening 21. As shown in FIGS. 2A to 2D, the face plate 20 is formed to have a front face inclined outwardly from the inner edge to the outer edge thereof and to have inner and outer rims 22 and 23 extending rearward respectively from the inner and outer edges. The face plate 20 is placed over the plate frame 10 with the outer rim 23 engaged with the loop wall 13 and abutting against the outer flange 14 of the plate frame 10. The outer rim 23 has projections 24 which fit into corresponding dents 15 in the outer flange 14 of plate frame 10.

As best shown in FIG. 1, the under plate 30 is also a rectangular frame which is stamped from a flat metal sheet to comprise parallel side bars 31 connected by end bars 32. Each side bar 31 has its outer edge turned along the length thereof to form thereat an elongate rib 33 which engages with the inside of the inner rim 22 of the face plate 20. Formed at the opposite ends of each end bar 32 are stepped ears 34 with screw holes 35. The under plate 30 is fixed to the rear of the face plate 20 by means of screws 25 extending through the screw holes 35 of the ears 34 and into corresponding bosses (not shown) integrally formed on the rear of the face plate 20. It is noted at this time that the under plate 30 is received within the thickness of the face plate 20 so that the under plate 30 does not add any extra thickness to the face plate 20. Further, because the side bars 31 of the under plate 30 have their ribs 33 engaged with the inner rims 22 of the face plate over substantially the full length thereof and because the end bars 32 extend over the full width of the horizontal dimension of the center opening 21, the center opening 21 can be given an enhanced dimensional stability by the reinforcement of the under plate 30 against deformative forces applied to the face plate 20. With this result, the center opening 21 can be best utilized to receive within its full space the operator handles 70 of the switch assembly 40 without causing any jamming in the movement of the handles 70.

Figure 8A:
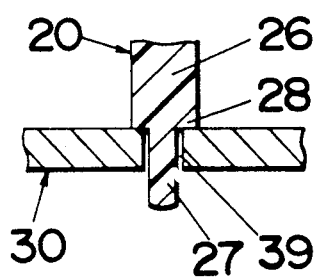
FIGS. 8A and 8B are views illustrating the manner in which an under plate is heat-bonded to a face plate of the cover plate assembly in accordance with a modification of the above embodiment.
Figure 8B:
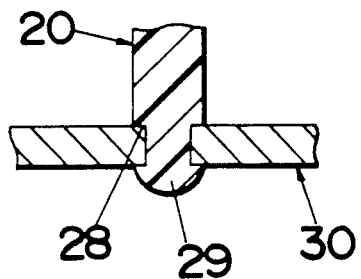

Also formed with the under plate 30 are tabs 36 which are exposed inside of the corners of the center opening 21 of the face plate 20. Each tab 36 has a screw 37 with a retainer ring 38 which is accessible from the front of the face plate 20 so that the screws 37 can be threaded into corresponding holes 84 in the mount bracket 80 for securing the face plate 20 directly to the mount bracket 80. Although the under plate 30 is secured to the rear of the face plate 20 by means of screws 25 in the above embodiment, it is equally possible to secure the under plate 30 and the face plate 20 by the use of heat-bonding technique, as shown in FIGS. 8A and 8B. In this modification, a face plate 20 is formed with studs 26 each having a narrowed tip 27 with a shoulder 28. Each narrowed tip 27 is inserted into each of corresponding holes 39 with the shoulder 28 abutting against the periphery of the hole 39, then heat is applied to deform the tip 27 so as to form thereat an enlargement 29, thus securing the under plate 30 to the face plate 20.

Referring to FIG. 9, another modification of the above embodiment is shown in which a face plate 20A is designed to have two center openings 21A which are separated by a mullion 120 for receiving in each of the center openings 21A like operator handles of the switch assembly as referred to in the above embodiment. Associated under plate 30A and plate frame 10A are correspondingly configured to mate the face plate 20A. The under plate 30A is additionally formed with a cross bar 130 which extends along the mullion 120 of the face plate 20A. The cross bar 130 has holes 131 into which corresponding bosses (not shown) on the rear of the mullion 120 are inserted and heat-deformed to secure the cross bar 130 to the mullion 120. At the opposite ends of the cross bar 130 there are also formed like ears 334A with screw holes 35A and like tabs 36A so that the under plate 3OA is secured to the face plate 20A by means of screws 25A extending respectively through the screw holes 35A of the ears 34A. Thus secured face plate 20A and the under plate 30A combination is then fixed to a correspondingly shaped mount bracket (not shown) by means of screws 37A extending through the respective tabs 36A. The other structures are identical to those of the above embodiment, and therefore like parts are designated by like numerals with suffix letter of "A".

FIG. 10 illustrates a further modification which is identical in structure to the above modification of FIG. 9 except that a face plate 20B is configured to have three separate center openings 21B separated by two parallel mullions 120B and that an under plate 30B is configured to have an additional cross bar 130B in registration respectively with the additional mullion 120B. Like parts are designated by like numerals utilized in the modification of FIG. 9 but with the suffix letter of "B". The feature of the modification is apparent from the figure in conjunction with the previous embodiment and modification and further description is deemed unnecessary. In the modifications of FIGS. 9 and 10, separate center openings 21A and 21B may be utilized to receive electrical wiring devices of different types.

What is claimed is:

1. A cover plate assembly for wall-mounted electrical wiring devices which are received within a wall opening, said cover plate assembly comprising:
    a plate frame for surrounding a wall opening said plate frame having a window for wiring devices to extend outwardly;
    a face plate placed over said plate frame to entirely conceal the same, said face plate being made from a plastic material and having a center opening; and
    an under plate adapted to be fixed with respect to a wall surface for holding said plate frame therebetween, said under plate being made from a flat metal stamping and secured to the rear of said face plate.

2. A cover plate assembly as set forth in claim 1, wherein said under plate is secured to said face plate by means of screws.

3. A cover plate assembly as set forth in claim 2, wherein said under plate is received within the thickness of the face plate.

4. A cover plate assembly as set forth in claim 1, wherein said face plate is formed on its rear face with studs which extend through corresponding holes in said under plate, each of said studs having its tip deformed by heat to effect a rigid connection between said face plate and said under plate.

5. A cover plate assembly as set forth in claim 1, wherein said under plate is formed in its inner periphery with tabs which are adapted to be fastened to a mount bracket for mounting electrical wiring devices, said tabs being accessible through said center opening of said face plate, said tabs being positioned to be concealed when an electrical wiring device having one or more operator handles is received in said center opening.

* * * * *